Jan. 9, 1968
D. O. EASTERLY
3,362,774
MOTION PICTURE CAMERA OF THE CARTRIDGE TYPE
Filed May 12, 1965
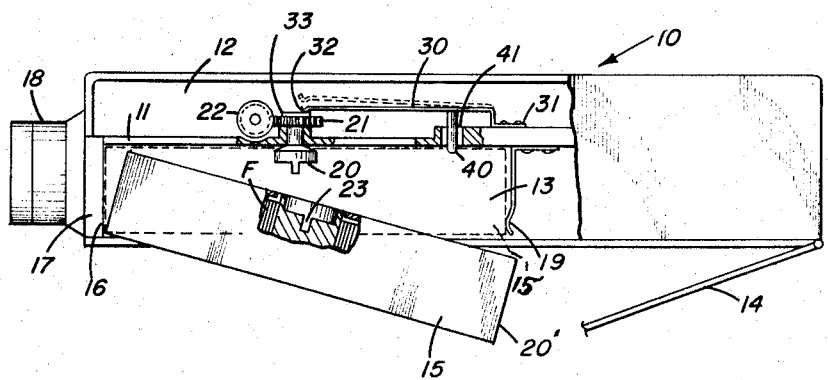
DONALD O. EASTERLY
INVENTOR.
BY
ATTORNEYS

United States Patent Office 3,362,774
Patented Jan. 9, 1968

3,362,774
MOTION PICTURE CAMERA OF THE
CARTRIDGE TYPE
Donald O. Easterly, Rochester, N.Y., assignor to Eastman Kodak Company, Rochester, N.Y., a corporation of New Jersey
Filed May 12, 1965, Ser. No. 455,198
3 Claims. (Cl. 352—72)

The present invention relates to motion picture cameras of the type adapted to handle film packaged in cartridges or magazines, and particularly to such a camera which is provided with means for applying a predetermined load to the driving mechanism thereof when there is no film cartridge loaded therein.

Motion picture cameras adapted to handle film packaged in cartridges or magazines are well known. These cameras generally include a power-driven mechanism which not only drives the intermittent film feeding claw and the shutter of the camera in timed relation, but also drives a clutch which is adapted to be drivingly connected to a driven clutch on the film cartridge when it is inserted into the camera in order to rotate a spool in the film cartridge to take up the film as it is moved past the exposure aperture of the camera by the intermittent film claw. Accordingly, the presence of a film cartridge in the camera introduces a load which the camera drive mechanism is specifically designed to handle and operate under.

It is ofttimes necessary or desirable to operate such a motion picture camera without film in it, but under no-load conditions the drive mechanism, whether spring or electrically driven will tend to operate at an excessive speed and produce an excessive amount of noise. Because of one or more of the following problems I have found it desirable to fractionally brake and thereby apply a load to the camera drive mechanism when there is no cartridge or film loaded in the camera:

(1) with certain motor governor designs the governing range is very limited so that with film in the camera the governor will operate properly, but without film the drive mechanism will speed up;

(2) speed up will also occur on some electric-drive cameras (when there is no film in the camera) if high-resistance dirt builds up between the commutator segments; and (3) with no film load on a drive mechanism which includes a gear train, tooth-to-tooth errors will cause an erratic noise.

I have found that a friction brake applied to the drive mechanism simulating a load like that which would be induced by the presence of film in the camera will overcome these difficulties. However, this brake load should be removed when a film cartridge is placed in the camera so that maximum power is available for moving the film.

The primary object of the present invention is to provide a brake for applying a predetermined load to the drive mechanism of a motion picture camera of the cartridge type when there is no film cartridge in the camera.

A further object is to provide such a brake for the camera drive mechanism which will be automatically applied when a film cartridge is removed from the camera and will be released in response to the insertion of a film cartridge into the camera.

And yet another object is to provide a brake of the type described which is so simple that it can be readily incorporated into existing cartridge type cameras with very little difficulty and at little expense.

The novel features that I consider characteristic of my invention are set forth with particularity in the appended claims. The invention itself, however, both as to its organization and its method of operation, together with additional objects and advantages thereof, will best be understood from the following description when read in connection with the accompanying drawing is a top plan view of a motion picture camera, with certain parts broken away and others shown partly in section, and showing a film cartridge partially inserted into a camera provided with a brake mechanism constructed in accordance with one embodiment of the present invention.

Referring now to the drawing, the camera casing 10 is divided by a longitudinally extending partition or mechanism plate 11 into a drive mechanism compartment 12 and a film cartridge chamber 13. The cartridge chamber may be opened and/or closed by a hinged door 14 to allow a film cartridge 15 to be inserted into and/or removed from the cartridge chamber 13 in the manner indicated. The front wall of the cartridge chamber 13 is provided by the rear wall 16 of a housing 17 which houses the conventional pull down claw and shutter mechanism, not shown, generally found in motion picture cameras. As is well known, the rear wall 16 also includes an exposure aperture and claw slot, not shown, which will line up with an exposure opening, not shown, in the front wall of the cartridge when it is properly positioned in the cartridge chamber, see dotted line position of cartridge in the drawing. Fixed to the front of the camera in optical alignment with the exposure aperture is an objective 18. A spring finger 19 is adapted to engage the rear wall 20' of the cartridge when it is inserted into the chamber 13 to urge the front wall of the cartridge against the rear wall 16.

The usual drive mechanism is provided within the mechanism compartment 12 to advance the film F in the cartridge intermittently past the exposure aperture and drive the shutter in proper timed relation to the intermittent film advancement to properly expose the film. In addition to a prime mover, e.g., electric motor or spring motor, not shown, this film driving mechanism includes a clutch member 20 rotatably mounted in the mechanism plate 11 and extending into the film cartridge chamber 13. This clutch member is connected to the prime mover by suitable gearing here shown as including a worm wheel 21 and a worm 22, the latter of which will be driven by the prime mover.

As is well known, the take up spool of the film cartridge 15 has connected thereto a driven clutch member 23 which is complementary to the clutch member 20 of the camera and is accessible through a hole in the side wall of the cartridge which is properly light-trapped so that the film in the cartridge will not be exposed to light therethrough. As is well known, when the film cartridge is inserted into the camera the clutch members 20 and 23 will engage one another so that as the camera drive mechanism is operated take up spool in the cartridge will wind up film as it is fed thereto by the camera claw mechanism.

Coming now to the present invention, as above discussed, I have found that when a cartridge type camera is operated without the cartridge in place the camera driving mechanism tends to run at an excesssive speed and tends to be much noiser than when operated with a cartridge in place. This is because the governor used on such drive mechanism is designed to operate under film load conditions and without a film load on the drive mechanism tooth-to-tooth errors of the gears of the mechanism tend to produce an erratic noise. In order to eliminate these problems I have provided a brake for the camera drive mechanism which simulates the normal film load and which is applied to the camera drive mechanism at all times when there is no cartridge in place. This brake is released automatically when a film cartridge is inserted into the camera.

According to the disclosed embodiment of the present invention, this brake mechanism comprises a spring member 30 fastened at one end 31 to the partition 11 and having a brake shoe portion 32 on its free end which is adapted to normally frictionally engage the face of the worm wheel 21 of the camera drive mechanism, or a hub portion 33 forming a part thereof. This spring member is so adjusted that the frictional braking action it applies to the camera drive mechanism simulates that imposed by the film load when a film cartridge is in place in the camera, e.g., a torque load on the motor shaft at about ⅛" ounce. While the load applied to the camera mechanism by this brake is a constant load rather than a pulsating load as is true of the normal film load due to the intermittent action of the camera claw, it can be readily adjusted by changing the tension in the spring member to produce the desired result.

Staked or otherwise fastened to the spring member 30 is a plunger 40 which extends through hole 41 in the partition 11 and into an extended sensing position within the cartridge chamber when there is no cartridge therein. Under these conditions, as indicated in solid lines in the drawing, the brake is applied to the drive mechanism of the camera. When a film cartridge is inserted into the camera, as indicated in dotted lines in the drawings, the side wall thereof engages the end of the plunger 40 and presses it upwardly to its retracted or withdrawn position whereby to relieve the brake from the drive mechanism, see dotted line position of spring member 30.

It will thus be seen that a brake mechanism which is responsive to the presence or absence of a film cartridge in the camera can be provided in a very simple manner. It will also be appreciated that this brake is so simple that it can be applied to existing cameras with little difficulty and requiring little modification in the existing camera structure.

Although I have shown and described a specific embodiment of my invention, I am fully aware that many modifications thereof are possible. For example, instead of having the plunger 40 staked directly to the spring member 30 as shown, a member for sensing the presence of a film cartridge in the chamber 13 and subsequently actuating the spring member 30 to release the brake (the equivalent of plunger 40) could be separate from the spring member 30 and biased to a cartridge sensing position. This sensing member would pick up and move the spring member from its normal braking position when displaced from its normal position by the insertion of a cartridge into the camera. My invention, therefore, is not to be limited to the precise structural detail shown and described but is intended to cover all modifications coming within the scope of the appended claims.

I claim:
1. In motion picture apparatus for use with a film cartridge wherein the cartridge includes film drive means having a driven clutch member accessible from the exterior of said cartridge, and wherein said apparatus includes: a chamber for receiving such a film cartridge in operating position therein, and drive mechanism including a driving clutch member extending into said chamber and positioned to drivingly engage the driven clutch member of a cartridge when the cartridge is in operating position within said chamber;
the improvement comprising:
means normally placing a predetermined load on said drive mechanism corresponding to the load which would be induced by the presence of a film cartridge in operating position within said chamber and the resulting engagement of said driven and driving clutch members,
and means responsive to the insertion of a film cartridge into said chamber to render the last-mentioned means ineffective, thereby to remove said predetermined load from said drive mechanism.

2. The invention according to claim 1 wherein said means normally placing a load on said drive mechanism comprises a brake member, said brake member being normally biased to a braking position wherein it engages and frictionally restrains said drive mechanism against its normally movement, said brake member also being movable from said braking position to permit unrestrained movement of said drive mechanism;
and wherein said means responsive to insertion of a film cartridge comprises:
a movable actuating member extending into said film cartridge chamber and having a normal sensing position and a retracted position, said actuating member being movable from said sensing position to said retracted position in response to the insertion of a film cartridge into said chamber,
and a connecting means between said actuating member and said brake member for effecting movement of said brake member from said braking position in response to movement of said actuating member to said retracted position and for permitting said braking member to return to said braking position in response to movement of said actuating member to said sensing position.

3. The invention according to claim 1 wherein said means normally placing a load on said driving mechanism comprises a brake member, said brake member being normally biased to a braking position wherein it fractionally engages and restrains said drive mechanism against its normal movement, said brake member also being movable from said braking position to permit unrestrained movement of said drive mechanism;
and wherein said means responsive to the insertion of a film cartridge comprises a brake actuating member connected to said brake member and having a sensing position and a withdrawn position, said actuating member being movable to said sensing position within said film cartridge compartment in the absence of a film cartridge therein as said brake member moves to its braking position and being movable to said withdrawn position to move said brake member from its braking position in response to the insertion of a film cartridge into said cartridge chamber.

References Cited

UNITED STATES PATENTS

| 1,789,220 | 1/1931 | Debrie | 352—72 |
| 2,105,630 | 1/1938 | Becker | 352—72 |
| 2,226,363 | 12/1940 | Williams | 352—72 |
| 3,120,781 | 2/1964 | Babcock et al. | 352—72 |

FOREIGN PATENTS 441,054    1/1936    Great Britain.

JULIA E. COINER, *Primary Examiner.*